(12) United States Patent
Forster et al.

(10) Patent No.: US 12,410,357 B2
(45) Date of Patent: Sep. 9, 2025

(54) USE OF PERCITRIC ACID IN OIL- AND GAS-FIELD OPERATIONS

(71) Applicant: Secure Specialty Chemicals Corp., Calgary (CA)

(72) Inventors: Taryn Forster, Okotoks (CA); David Rauser, Calgary (CA); Douglas Bruce, Calgary (CA)

(73) Assignee: Secure Specialty Chemicals Corp., Calgary (CA)

( * ) Notice: Subject to any disclaimer, the term of this patent is extended or adjusted under 35 U.S.C. 154(b) by 0 days.

(21) Appl. No.: 18/578,654

(22) PCT Filed: Jul. 11, 2022

(86) PCT No.: PCT/CA2022/051079
§ 371 (c)(1),
(2) Date: Jan. 11, 2024

(87) PCT Pub. No.: WO2023/283727
PCT Pub. Date: Jan. 19, 2023

(65) Prior Publication Data
US 2024/0254381 A1    Aug. 1, 2024

Related U.S. Application Data

(60) Provisional application No. 63/220,738, filed on Jul. 12, 2021.

(51) Int. Cl.
*E21B 37/06* (2006.01)
*C09K 8/528* (2006.01)

(52) U.S. Cl.
CPC ............. *C09K 8/528* (2013.01); *E21B 37/06* (2013.01)

(58) Field of Classification Search
None
See application file for complete search history.

(56) References Cited

U.S. PATENT DOCUMENTS 3,909,447 A    9/1975  Redmore et al.
4,443,609 A    4/1984  Oude Alink et al.
5,647,997 A *  7/1997  Holzhauer ............... C02F 1/24
                                                  210/705

(Continued)

FOREIGN PATENT DOCUMENTS

CA    2900460 A1    3/2014
CA    2954341 A1    2/2016

(Continued)

OTHER PUBLICATIONS

International Search Report and Written Opinion from corresponding PCT Application No. PCT/CA2022/051079 mailed Sep. 22, 2022—13 pages.

*Primary Examiner* — Andrew Sue-Ako
(74) *Attorney, Agent, or Firm* — Christensen, Fonder, Dardi PLLC; Timothy J. Busse (57) ABSTRACT

The present disclosure generally relates to compositions containing percitric acid, treatment fluids containing such compositions and methods of using the treatment fluids during various oil- and gas-field operations including hydraulic fracturing, remediation, production, disposal well chemistry and cleaning equipment both above surface and downhole used in connection with oil- and gas-field operations.

19 Claims, 4 Drawing Sheets

(56) References Cited

U.S. PATENT DOCUMENTS

| | | | |
|---|---|---|---|
| 5,720,983 A * | 2/1998 | Malone | A61L 2/186 |
| | | | 252/387 |
| 5,965,785 A | 10/1999 | Braden et al. | |
| 7,156,178 B2 * | 1/2007 | Rae | C09K 8/52 |
| | | | 166/279 |
| 7,435,706 B2 | 10/2008 | Mueller et al. | |
| 7,638,466 B2 | 12/2009 | Mueller et al. | |
| 9,018,142 B2 | 4/2015 | Rovison, Jr. et al. | |
| 9,944,843 B2 | 4/2018 | Conway | |
| 10,202,834 B2 | 2/2019 | Conway | |
| 10,344,199 B2 | 7/2019 | Pisanova et al. | |
| 10,526,529 B2 | 1/2020 | Mason | |
| 10,633,575 B2 | 4/2020 | Conway | |
| 10,697,282 B2 | 6/2020 | Conway | |
| 11,332,658 B2 | 5/2022 | Conway | |
| 11,802,234 B2 | 10/2023 | Conway | |
| 2006/0162928 A1 * | 7/2006 | Collins | C09K 8/54 |
| | | | 507/225 |
| 2010/0021558 A1 | 1/2010 | Dada et al. | |
| 2010/0160449 A1 | 6/2010 | Rovison, Jr. et al. | |
| 2010/0222242 A1 | 9/2010 | Huang et al. | |
| 2011/0152133 A1 | 6/2011 | Sanders et al. | |
| 2013/0259743 A1 * | 10/2013 | Keasler | C02F 3/342 |
| | | | 424/94.4 |
| 2014/0072653 A1 * | 3/2014 | Buschmann | C07C 409/26 |
| | | | 210/759 |
| 2022/0145157 A1 | 5/2022 | Subrahmanyan et al. | |
| 2022/0259484 A1 | 8/2022 | Farmer et al. | |
| 2024/0124763 A1 | 4/2024 | Conway | |

FOREIGN PATENT DOCUMENTS

| | | |
|---|---|---|
| GB | 2393464 A | 3/2004 |
| GB | 2405894 A | 3/2005 |
| KR | 20210075715 A | 6/2021 |
| WO | 2003006581 A2 | 1/2003 |
| WO | 2004044266 A1 | 5/2004 |
| WO | 2013148200 A1 | 10/2013 |
| WO | 2017196567 A1 | 11/2017 |
| WO | 2023084214 A1 | 5/2023 |

* cited by examiner

USE OF PERCITRIC ACID IN OIL- AND GAS-FIELD OPERATIONS

CROSS-REFERENCE TO RELATED APPLICATION

This application is a National Stage filing of PCT Application No. PCT/CA2022/051079 filed Jul. 11, 2022, which claims priority to U.S. Provisional Patent Application Ser. No. 63/220,738 filed Jul. 12, 2021. The noted applications are incorporated herein by reference.

TECHNICAL FIELD

The present disclosure generally relates to compositions containing percitric acid and methods of using the composition in treatment fluids during various oil- and gas-field operations including hydraulic fracturing, remediation, production, disposal well chemistry and cleaning various equipment both above surface and downhole.

BACKGROUND

When drilling wells, completing wells, or producing hydrocarbons from wells in subterranean formations, various fluids typically are used in the operation for a variety of reasons. For the purposes herein, these fluids will be generically referred to as "treatment fluids." Common uses for treatment fluids include: lubrication and cooling of drill bit cutting surfaces while drilling generally or drilling-in (i.e., drilling in a targeted petroliferous formation), transportation of cuttings (pieces of formation dislodged by the cutting action of the teeth on a drill bit) to the surface, controlling formation fluid pressure to prevent blowouts, maintaining well stability, suspending solids in the well, minimizing fluid loss into and stabilizing the formation through which the well is being drilled, minimizing fluid loss into the formation after the well has been drilled and during completion operations such as, for example, perforating the well, replacing a tool, attaching a screen to the end of the production tubulars, gravel-packing the well, or fracturing the formation in the vicinity of the well, displacing the fluid within the well with another fluid, cleaning the well, testing the well, emplacing a packer and packer fluid, abandoning the well or preparing the well for abandonment, and otherwise treating the well, the subterranean formation or any surface or downhole equipment used in connection therewith.

Treatment designs typically mandate such fluids exhibit a certain level of viscosity. Polymers, such as polyacrylamides, are often used to provide the requisite viscosity. For instance, polyacrylamides are often used to form viscous gels to prevent fluid loss into the formation. In treatment fluids used for drilling, such polymers serve to suspend solids and assist in floating debris out of the wellbore. In treatment fluids used for stimulation, such polymers are used to increase the capability of proppant transport into the fracture during the fracturing operation and to also reduce friction, control fluid loss and control fracture geometry. If left in the formation, the polymers can deposit and also crosslink with metal ions to cause formation and conductivity damage. Therefore, effective means of degrading the polymer and polymer-metal complexes is desired in order to undo the polymer's viscosity-modifying effects within the treatment fluid and to minimize or remove any deposits that may form so as to facilitate recovery of the hydrocarbon product.

Moreover, treatment fluids (for example, water that is produced during the above operations) may be saturated with inorganic minerals. Any change in pressure or temperature can alter the equilibrium between the water and the saturated minerals, and with this disturbance in equilibrium, it is possible for the inorganic mineral components to form a precipitate or deposit, such as in the form of sulfates (e.g. barium sulfate, strontium sulfate, calcium sulfate), chlorides (e.g. barium chloride, strontium chloride, calcium chloride), carbonates, iron sulfides, etc. This is also detrimental to hydrocarbon product recovery since it can disrupt the free flow of fluids through pipes, vessels and various process equipment.

Accordingly, it would be desirable to develop improved treatment fluids containing an agent that has low toxicity and is capable of at least one of: reversing the viscosity-modifying effects of polymer additives: degrading and/or removing polymer additive deposits or polymer-metal complexes found within the wellbore and formation; inhibiting the formation of and/or removing inorganic mineral precipitates; providing biocidal activity at a low concentration; and, removing deposits (organic, inorganic or mixtures thereof) from surfaces of equipment connected with the wellbore and formation.

SUMMARY

The present disclosure provides various methods of producing treatment fluids containing percitric acid and one more chemical additives. The treatment fluids may be used in methods, such as, but not limited to: degrading a range of polymers commonly used in oil- and gas-field operations; reducing the viscosity of treatment fluids that have been injected into a wellbore; degrading a polymer on or within a component of a fluid handling system associated with oil- and gas-field operations; preventing the formation of polymer deposits in a wellbore or within the subterranean formation during an oil- and gas-field operation; preventing a polymer-polyvalent metal ion complex deposit from forming during an oil- and gas-field operation; removing or suppressing polyvalent metal ions from water or a flowback fluid to make such water or flowback fluids suitable for subsequent use in oil- and gas-field operations; controlling iron in a subterranean formation during an oil- and gas-field operation; reducing microbial or viral populations on a surface or object or in a liquid system containing a body or stream of water or flowback fluid during oil- and gas-field operations; and removing contaminants from surfaces of equipment used in connection with an oil- and gas-field operation.

DETAILED DESCRIPTION

The following terms shall have the following meanings:

The term "comprising" and derivatives thereof are not intended to exclude the presence of any additional component, step or procedure, whether or not the same is disclosed herein. In order to avoid any doubt, all compositions claimed herein through use of the term "comprising" may include any additional additive or compound, unless stated to the contrary. In contrast, the term, "consisting essentially of" if appearing herein, excludes from the scope of any succeeding recitation any other component, step or procedure, except those that are not essential to operability and the term "consisting of", if used, excludes any component, step or procedure not specifically delineated or listed. The term "or", unless stated otherwise, refers to the listed members individually as well as in any combination.

The articles "a" and "an" are used herein to refer to one or to more than one (i.e. to at least one) of the grammatical objects of the article. By way of example, "a peracid" means one peracid or more than one peracid. The phrases "in one embodiment", "according to one embodiment" and the like generally mean the particular feature, structure, or characteristic following the phrase is included in at least one embodiment of the present disclosure and may be included in more than one embodiment of the present disclosure. Importantly, such phrases do not necessarily refer to the same aspect. If the specification states a component or feature "may", "can", "could", or "might" be included or have a characteristic, that particular component or feature is not required to be included or have the characteristic.

The term "about" as used herein can allow for a degree of variability in a value or range, for example, it may be within 10%, within 5%, or within 1% of a stated value or of a stated limit of a range.

The terms "preferred" and "preferably" refer to embodiments that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the present disclosure.

The term "optional" or "optionally" means that the subsequently described event, circumstance or material may or may not occur or be present, and that the description includes instances where said event, circumstance or material occurs or is present and instances where it does not occur or is not present.

Values expressed in a range format should be interpreted in a flexible manner to include not only the numerical values explicitly recited as the limits of the range, but to also include all of the individual numerical values or sub-ranges encompassed within that range as if each numerical value and sub-range is explicitly recited. For example, a range such as from 1 to 6, should be considered to have specifically disclosed sub-ranges, such as, from 1 to 3, from 2 to 4, from 3 to 6, etc., as well as individual numbers within that range, for example, 1, 2, 3, 4, 5, and 6. This applies regardless of the breadth of the range.

The term "substantially free" refers to a composition in which a particular compound or moiety is present in an amount that has no material effect on the composition. In some embodiments, "substantially free" may refer to a composition in which the particular compound or moiety is present in the composition in an amount of less than 2 wt. %, or less than 1 wt. %, or less than 0.5 wt. %, or less than 0.1 wt. %, or less than 0.05 wt. %, or even less than 0.01 wt. %, based on the total weight of the composition, or that no amount of that particular compound or moiety is present in the respective composition.

As used herein, the term "peracid" may also be referred to as a "percarboxylic acid" or "peroxyacid." Peracids also include peracids having at least one acidic group or peracidic group in the deprotonated form, for example $MH_2$(peracid), $M_2H$(peracid) or Ms(peracid) where M may be sodium, potassium, ammonium, imidizolium, magnesium, or any other monocationic or polycationic species.

The term "water" refers to a variety of water sources, such as fresh water, pond water, sea water, salt water or brine source, brackish water, or the like.

The term "flowback fluid(s)" is used herein to refer collectively and generically to produced water, flowback water, returning treatment fluids, and the like. As used herein, "produced water" generally refers to water produced from a wellbore that is not primarily a treatment fluid and may contain formation waters. In many cases, the composition of a flowback fluid is inexact or unknown.

The term "wt. %" means weight percent.

The term "gpt" means gallons per thousand gallons and the term "ppm" means parts per million.

According to one embodiment, the present disclosure is directed to a method for forming a composition containing percitric acid and to a composition containing percitric acid formed by such a method, the composition being suitable for use in various treatment fluids for oil- and gas-field operations. The method may generally include contacting citric acid with hydrogen peroxide in the presence of water or a flowback fluid to form a composition that includes percitric acid. The percitric acid may be monopercitric acid, dipercitric acid, tripercitric acid or any mixture thereof. In one embodiment, the percitric acid is a monopercitric acid; however, by adjusting the mole ratios of hydrogen peroxide to citric acid, dipercitric acid or tripercitric acid may be formed. (It is generally understood that when there is an excess of citric acid, the composition that is formed will also comprise citric acid).

In some embodiments, before the contacting step, the citric acid can be provided in a composition that comprises citric acid, for example, an aqueous solution that comprises citric acid. In other embodiments, before the contacting step, the citric acid can be provided in a composition that comprises a substance that generates citric acid upon contact with water. Any suitable substance that generates citric acid can be used in the present methods. The substance can be a salt of citrate, for example, a sodium or ammonium salt of citrate, or an ester of citrate.

In some embodiments, before the contacting step, the hydrogen peroxide can be provided in a composition that comprises hydrogen peroxide, for example, an aqueous solution that comprises hydrogen peroxide. In other embodiments, before the contacting step, the hydrogen peroxide can be provided in a composition that comprises a substance that generates hydrogen peroxide upon contact with water. Any suitable substance that generates hydrogen peroxide can be used in the present methods and in some embodiments can comprise a precursor of hydrogen peroxide. For example, the precursor of hydrogen peroxide can be sodium percarbonate, sodium perborate, sodium persulfate, urea hydrogen peroxide, or PVP-hydrogen peroxide.

In still another embodiment, an oxygen-containing gas can be supplied to an electrolysis unit to produce peroxide species (e.g. hydrogen peroxide, peroxide ions, peroxide radicals) which can be contacted with citric acid.

Before the contacting step, the molar ratio of hydrogen peroxide to citric acid may range between about 0.01:1 to about 100:1, such as about 0.02:1 to about 50:1 or about 0.05:1 to about 20:1 or about 0.07:1 to about 10:1 or about 0.1:1 to about 3:1. In other embodiments, the molar ratio of hydrogen peroxide to citric acid may range between about 0.5:1 to about 2:1 or between about 0.75:1 to about 1.5:1 or between about 0.95:1 to about 1.05:1 or about 1:1. In one embodiment the molar ratio of hydrogen peroxide to citric acid is chosen such that the composition includes at least one of monopercitric acid, dipercitric acid or tripercitric acid, preferably monopercitric acid.

In some embodiments, a base (for example, NaOH or KOH) may be added to sufficiently raise the pH so that the composition includes a conjugate base of percitric acid.

In one embodiment, the citric acid and the hydrogen peroxide can be contacted in the absence of a $C_2$-$C_{22}$ carboxylic acid, a $C_2$-$C_{22}$ percarboxylic acid or a mixture thereof and accordingly the peracid in the composition includes percitric acid only (i.e. it is substantially free of peracids other than percitric acid).

In other embodiments, the citric acid and hydrogen peroxide can be contacted in the presence of at least one other $C_2$-$C_{22}$ carboxylic acid, for example a monocarboxylic acid, a polycarboxylic acid, or a mixture thereof and the peracid in the composition includes percitric acid and the $C_2$-$C_{22}$ percarboxylic acid. Any suitable $C_2$-$C_{22}$ carboxylic acid can be used in the present methods. In some embodiments, the $C_2$-$C_{22}$ carboxylic acid is selected from oxalic acid, malonic acid, succinic acid, glutaric acid, adipic acid, maleic acid, fumaric acid, acetylenedicarboxylic acid, glutaconic acid, muconic acid, glutinic acid, citraconic acid, tartronic acid, malic acid, tartaric acid, oxaloacetic acid, aspartic acid, glutamic acid, saccharic acid, phthalic acid, isophthalic acid, ethylenediaminetetraacetic acid, nitrilotriacetic acid acetic acid and a mixture thereof. In one embodiment, the $C_2$-$C_{22}$ carboxylic acid is substantially free of acetic acid and formic acid. Thus, the composition is substantially free of peracetic acid and performic acid.

The present method above can be conducted at any suitable temperature. In some embodiments, the present method can be conducted at a temperature ranging from about −2° C. to about 70° C. In other embodiments, the present method can be conducted under ambient conditions. In still other embodiments, the present method can be conducted under heating, for example, at a temperature ranging from about 30° C. to about 70° C.

The composition can comprise any suitable concentration of percitric acid. In some embodiments, the composition contains from about 0.001 wt. % to about 70 wt. % percitric acid, based on the total weight of the composition, for example, greater than about 0.001 wt. %, greater than about 0.1 wt. %, greater than about 0.5 wt. %, greater than about 1 wt. %, greater than about 5 wt. %, greater than about 10 wt. %, greater than about 15 wt. %, greater than about 20 wt. %, greater than about 25 wt. %, greater than about 30 wt. %, greater than about 35 wt. %, greater than about 40 wt. % or greater than about 45 wt. % percitric acid, or about 50 wt. % or greater, based on the total weight of the composition. In still other embodiments, the composition may contain from about 0.5 wt. % to about 50 wt. %, or from about 1 wt. % to about 40 wt. %, or from about 10 wt. % to about 30 wt. % or from about 15 wt. % to about 25 wt. % or from about 18 wt. % to about 22 wt. % of percitric acid, based on the total weight of the composition.

The composition can also include any suitable concentration of hydrogen peroxide. In some embodiments, the composition can contain about 35 wt. % or less hydrogen peroxide, based on the total weight of the composition, for example, less than about 30 wt. %, less than about 25 wt. %, less than about 20 wt. %, less than about 15 wt. %, less than about 10 wt. %, less than about 9 wt. %, less than about 8 wt. %, less than about 7 wt. %, less than about 6 wt. %, or less than about 5 wt. %, less than about 4.5 wt. %, less than about 4 wt. %, less than about 3.5 wt. %, less than about 3 wt. %, less than about 2.5 wt. %, less than about 2 wt. %, less than about 1.5 wt. %, less than about 1 wt. %, less than about 0.9 wt. %, less than about 0.8 wt. %, less than about 0.7 wt. %, less than about 0.6 wt. %, less than about 0.5 wt. %, less than about 0.4 wt. %, less than about 0.3 wt. %, less than about 0.2 wt. %, less than about 0.1 wt. %, less than about 0.05 wt. %, less than about 0.01 wt. %, less than about 0.005 wt. %, or less than about 0.001 wt. % of hydrogen peroxide, based on the total weight of the composition. In some embodiments, the composition is substantially free of hydrogen peroxide.

In some embodiments, the composition can also include any suitable concentration of citric acid. In some embodiments, the composition can contain about 70 wt. % or less citric acid, based on the total weight of the composition, for example, less than about 60 wt. %, less than about 50 wt. %, less than about 40 wt. %, less than about 30 wt. %, less than about 20 wt. %, less than about 10 wt. %, less than about 8 wt. %, less than about 7 wt. %, less than about 6 wt. %, or less than about 5 wt. %, less than about 4.5 wt. %, less than about 4 wt. %, less than about 3.5 wt. %, less than about 3 wt. %, less than about 2.5 wt. %, less than about 2 wt. %, less than about 1.5 wt. %, less than about 1 wt. %, less than about 0.9 wt. %, less than about 0.8 wt. %, less than about 0.7 wt. %, less than about 0.6 wt. %, less than about 0.5 wt. %, less than about 0.4 wt. %, less than about 0.3 wt. %, less than about 0.2 wt. %, less than about 0.1 wt. %, less than about 0.05 wt. %, less than about 0.01 wt. %, less than about 0.005 wt. %, or less than about 0.001 wt. % of citric acid, based on the total weight of the composition. In some embodiments, the composition is substantially free of citric acid.

The present method above can further include the step of adding a corrosion inhibitor so that the composition further contains the corrosion inhibitor. Any suitable corrosion inhibitor can be added. In some embodiments the corrosion inhibitor is a thiophosphate, pyrophosphate or oxygen phosphate as disclosed in U.S. Pat. No. 3,909,447, a tetrahydrothiazole phosphonic acid or phosphonate as disclosed in U.S. Pat. No. 4,443,609, blends of 2-amino-1-methoxypropane, sec-butylamine, n-butylamine, dipropylamine monoamylamine, isobutylamine; and 3-amino-1-methoxypropane as disclosed in U.S. Pat. No. 5,965,785, a sulfur and phosphorus-free aromatic compound substituted with nitrogen containing functional groups at the 5-, or 3, 5-position as disclosed in WO/03/006581, a quaternary ammonium compound as disclosed in WO04/044266, or a phosphorus-based constituent and a sulfur-based constituent, nitrogen-based constituent, or combination thereof as disclosed in WO08/005058, each incorporated herein by reference in their entireties.

In other embodiments, the corrosion inhibitor can be a phosphate ester, a derivative of the phosphate ester, a diacid, a derivative of the diacid, a quat amine, a derivative of the quat amine, an imidazoline, a derivative of the imidazoline, an alkyl pyridine, a derivative of the alkyl pyridine, a phosphonium salt, a derivative of the phosphonium salt, or a combination thereof.

In another embodiment, the corrosion inhibitor may include a neutralizing amine. Suitable neutralizing amines include morpholine, methoxypropylamine, ethyienediamine, monoethanolalmine, dimethylethanolamine diethylhydroxylamine, and hydrazine didrates.

In still another embodiment, the corrosion inhibitor may include a cationic surfactant comprising an ammonium halide. The ammonium halide may include any suitable types of ammonium halides. In embodiments, the ammonium halide includes alkyl ammonium halides, polyalkyl ammonium halides, benzyl triethyl ammonium halides or any combinations thereof. In embodiments, the cationic surfactant includes any combination or at least one of an alkyl trimethyl ammonium halide, alkyl triethyl ammonium halide, an alkyl dimethyl benzyl ammonium halide, and one or more imidazolinium halides.

In yet another embodiment, the corrosion inhibitor may include a phosphonate, including phosphonic acid and esters, such as tetrahydrothiazoles phosphonic acids or esters. In one embodiment, the phosphonate is an alkali metal (or functionally equivalent) salt of diethylene triamine penta(methylene phosphonic acid). Such phosphonates may be complete or partial salts and are preferably those of sodium and/or potassium, e.g. tripotassium diethylene triamine penta(methylene phosphonate), tetrasodium diethylene triamine penta(methylene phosphonate), etc. Mixtures of such phosphonates may also be employed if desired. Additional phosphorus-based compounds suitable for use, include thiophosphonic acid and the salts and alkyl, and aryl esters of the same.

In yet another embodiment, the corrosion inhibitor may be an alkali metal polyphosphate having the general formula $M_{n+2}P_nO_{3n+1}$ where M is an alkali metal, including sodium and potassium or a cation functionally equivalent such as ammonium, n is an integer of at least 2, such as 2 to 20. Examples include, but are not limited to, di-, tri- and tetra-sodium pyrophosphate, di-, tri- and tetra-potassium pyrophosphate, sodium tetrapolyphosphate, potassium hexametaphosphate, sodium hexametaphosphate, potassium tripolyphosphate and sodium tripolyphosphate. Such polyphosphates include complete and partial salts, as well as those having mixed cations, e.g. a sodium potassium tripolyphosphate. Mixtures of polyphosphates may also be used. It has been surprisingly found that the polyphosphates and phosphonates described above not only provide protection against corrosion, but may also allow the composition to exhibit a remarkably long shelf-life stability over an extended period of time across abroad a temperature range of from about 20° C. to about 70° C. For example, the composition may exhibit a shelf-life stability of at least 1 week, or at least 2 weeks, or at least 3 weeks, or at least 1 month, or at least 6 weeks, or at least 2 months, or at least 10 weeks, or at least 3 months at a temperature ranging rom about 20° C. to about 70° C. Thus, in another embodiment, there is provided a method of stabilizing the composition for an extended period of time across a temperature range of from about 20° to about 70° C. including the step of adding a corrosion inhibitor comprising a polyphosphate or phosphonate to the composition. In still another embodiment, there is provided the composition of the present disclosure that further includes a stabilizing effective amount of a corrosion inhibitor comprising a polyphosphate or phosphonate, the stabilizing effective amount being any amount which will effectively retard or prevent degradation of the composition for an extended period of time at a temperature range from about 20° C. to about 70° C. According to another embodiment, there is provided a method for storing a percitric acid containing composition, which method includes storing the above compositions, wherein the composition retains at least about 80% of the percitric acid activity after storage for any suitable time under any suitable conditions, e.g., retaining at least about 80% of the percitric acid activity after storage of about 30 days at a temperature ranging between about 20° C. to about 70° C. Preferably, the present compositions retain at least about 85%, 90% or higher of the percitric acid activity after storage of about 30 days at a temperature ranging between about 20° C. to about 70° C.

The corrosion inhibitor can be added at any suitable time. In some embodiments, the corrosion inhibitor can be added before the citric acid is contacted with the hydrogen peroxide. In other embodiments, the corrosion inhibitor can be added concurrently when the citric acid is contacted with the hydrogen peroxide. In still other embodiments, the corrosion inhibitor can be added after the citric acid has been contacted with the hydrogen peroxide.

In an embodiment, the corrosion inhibitor may be present in the composition in an amount of between about 1 ppm to 100,000 ppm. In a further embodiment, the corrosion inhibitor is present in the composition in an amount of at least about 0.0001 wt. % (w/w) to about 20 wt. %, such as at least about 0.0001 wt. % to about 10 wt. %, or at least about 0.0001 wt. % to about 5 wt. %, or at least about 0.0001 wt. % to about 1 wt. %, or at least about 0.0001 wt. % to about 0.1 wt. %, or at least about 0.0001 wt. % to about 0.05 wt. %, based on the total weight of the composition.

The present method above can be used to generate percitric acid in any suitable manner or at any suitable location. For example, in some embodiments, the present method above can be used to generate percitric acid in situ for the application of the formed percitric acid. In other non-limiting embodiments, a percarbonate, persulfate, perborate or other oxidizer is used to generate hydrogen peroxide in situ upon reaction with water (or an oxygen-containing gas is supplied to an electrolysis unit to produce peroxide species) which can then react with citric acid to form percitric acid.

The composition described above may be combined with one or more chemical additives to form a treatment fluid. Examples of chemical additives include, but are not limited to, polymers, wetting agents, organophilic clays, oxygen scavengers, proppants, biocides, weighting agents, foaming agents, surfactants, dispersants, interfacial tension reducers, solvents, thinning agents, stabilizing agents/pH buffers, scale inhibitors and mixtures thereof.

The polymer can be any polymer used in an oil- and gas-field operation for modifying the viscosity of the treatment fluid. For example, the polymer may be a polysaccharide, such as a galactomannan polymer (for example, guar gum), a derivatized galactomannan polymer, starch, xanthan gum, a derivatized cellulose (for example, hydroxy cellulose or hydroxyalkyl cellulose), a polyvinyl alcohol polymer, or a synthetic polymer that is the product of a polymerization reaction comprising one or more monomers selected from the group consisting of vinyl pyrrolidone, 2-acrylamido-2-methylpropanesulfonic acid, acrylic acid, methacrylic acid, styrene sulfonic acid, acrylamide, and other monomers currently used for viscosity-modifying polymers.

As used herein, the terms "polymer," "polymers," "polymeric," and similar terms are used in their ordinary sense as understood by one skilled in the art, and thus may be used herein to refer to or describe a large molecule (or group of such molecules) that contains recurring units. Polymers may be formed in various ways, including by polymerizing monomers and/or by chemically modifying one or more recurring units of a precursor polymer. A polymer may be a "homopolymer" comprising substantially identical recurring units formed by, for example, polymerizing a particular monomer. A polymer may also be a "copolymer" comprising two or more different recurring units formed by, for example, copolymerizing two or more different monomers, and/or by chemically modifying one or more recurring units of a precursor polymer. The term "terpolymer" may be used herein to refer to polymers containing three or more different recurring units. The term "polymer" as used herein is intended to include both the acid form of the polymer as well as its salts.

In some cases, the polymer can be a water-soluble polymer. In certain cases, the polymer can comprise a biopolymer, such as a polysaccharide. For example, the polysaccharide can be chosen from cellulose, galactomannan, derivatives thereof, and combinations thereof. Other examples include xanthan, starch, derivatives thereof, and combinations thereof. In some examples, the polysaccharide can comprise guar gum or a derivative thereof. Examples of guar derivatives include hydroxypropyl guar (UPG), carboxymethyl guar (CMG), and carboxymethyl hydroxypropyl guar (CMHPG). In some examples, the polysaccharide can comprise cellulose or a derivative thereof. Examples of cellulose derivatives include hydroxyethyl cellulose (HEC), In certain embodiments, the polymer can comprise a carbon-carbon backbone. For example, the polymer can comprise a synthetic polymer, such as a (co)polymer derived from one or more ethylenically unsaturated monomers. Examples of ethylenically unsaturated monomers include, for example, acrylamide derivatives such as, for example, N-methyl(meth)acrylamide, N,N'-dimethyl(meth)acrylamide, and N-methylolacrylamide, N-vinyl derivatives such as N-vinylformamide, N-vinylacetamide, N-vinylpyrrolidone or N-vinylcaprolactam, and vinyl esters, such as vinyl formate or vinyl acetate, vinyl aromatic monomers (for example, styrene), acid-containing monomers (for example, monomers comprising —COOH groups, such as acrylic acid or methacrylic acid), and monomers comprising sulfonic acid groups, such as vinylsulfonic acid, allylsulfonic acid, or 2-acrylamido-2-methylpropanesulfonic acid), and (meth) acrylate monomers. Examples of such polymers include polyacrylic acid, polyacrylamide (PAM), partially hydrolyzed polyacrylamide (HPAM), acrylamide-methyl-propane sulfonate (AMPS), copolymers thereof, and combinations thereof.

In other embodiments, the polymer can comprise a polyether. Examples of polyethers include poly(ethylene oxide) (also referred to as polyethylene glycol (PEG)), poly(propylene oxide) (also referred to as polypropylene glycol (PPG)), polytetramethylene glycol (PTMG), copolymers thereof, and combinations thereof.

In certain embodiments, the polymer can comprise a polyacrylamide. The polyacrylamide can comprise a polyacrylamide (co)polymer derived from acrylamide, N-substituted hydrosoluble derivatives of acrylamide, hydrosoluble N-vinylamides, and combinations thereof.

In other embodiments, the polymer may either be linear (non-crosslinked) or crosslinked, for example, using crosslinking agents such as borate or zirconate or titanate in the case of polysaccharides like guar, or other known crosslinkers in the case of synthetic polymers and copolymers like acrylamide-derived polymers and copolymers.

In one embodiment, the polymer may be present in an amount of at least about 0.001 wt. % to about 10 wt. %, preferably at least about 0.01 wt. % to about 5 wt. %, preferably at least about 0.01 wt. % to about 3 wt. %, at least about 0.01 wt. % to about 2 wt. %, preferably at least about 0.01 wt. % to about 1 wt. %, or preferably at least about 0.01 wt. % to about 0.5 wt. %, based on the total weight of the treatment fluid.

Exemplary wetting agents that may be suitable for use in the treatment fluids of the disclosed subject matter include, but are not limited to, crude tall oil, oxidized crude tall oil, organic phosphate esters, modified imidazolines and amidoamines, oleic acid based wetting agents, alkyl aromatic sulfates and sulfonates, and the like, and combinations or derivatives of these.

Examples of organophilic clays include, but are not limited to, a modified phyllosilicate (sheet silicate), more preferably a clay mineral modified with an organic cation (for example, a quaternary ammonium cation). For example, the organophilic clay may be a sheet silicate/clay mineral ion-exchanged with an organic cation. Suitable sheet silicates/clay minerals to be modified may include, but are not limited to, a kaolin, a smectite (for example, bentonite, montmorillonite, hectorite, laponite, biedellite, saponite, stevensite), an illite, a pyrophyilite, an attapugite/palygorskite, a sepiolite, or a mixture thereof.

Exemplary oxygen scavengers include, but are not limited to, sulfites, and bisulfites. Other oxygen scavengers are also possible and will be known to those skilled in the art.

Examples of proppants include, but are not limited to, sand, glass beads, walnut hulls, metal shot, resin-coated sands, intermediate strength ceramics, sintered bauxite, resin-coated ceramic proppants, plastic beads, polystyrene beads, thermoplastic particulates, thermoplastic resins, thermoplastic composites, thermoplastic aggregates containing a binder, synthetic organic particles including nylon pellets and ceramics, ground or crushed shells of nuts, resin-coated ground or crushed shells of nuts, ground or crushed seed shells, resin coated ground or crushed seed shells, processed wood materials, porous particulate materials, and combinations comprising at least one of the foregoing. Ground or crushed shells of nuts can comprise shells of pecan, almond, ivory nut, brazil nut, macademia nut, or combinations comprising at least one of the foregoing. Ground or crushed seed shells can include fruit pits, and can comprise seeds of fruits including plum, peach, cherry, apricot, and combinations comprising at least one of the foregoing. Ground or crushed seed shells can further comprise seed shells of other plants including maize, for example corn cobs and corn kernels. Processed wood materials can comprise those derived from woods including oak, hickory, walnut, poplar, and mahogany, and includes such woods that have been processed by any means that is generally known including grinding, chipping, or other forms of particulization. A porous particulate material can be any porous ceramic or porous organic polymeric material, and can be natural or synthetic. The porous particulate material can further be treated with a coating material, a penetrating material, or modified by glazing. Proppants are typically used in concentrations between about 1 to 8 lbs. per gallon of the treatment fluid, although higher or lower concentrations may also be used as desired.

Non-limiting examples of biocides include didecyl dimethyl ammonium chloride, gluteral, Dazomet, bronopol, tributyl tetradecyl phosphonium chloride, tetrakis (hydroxymethyl) phosphonium sulfate, glutaraldehyde, sodium hypochlorite, and sodium hydroxide. Other biocides are also possible and will be known to those skilled in the art.

The biocide may be employed in amounts sufficient to provide antimicrobial efficacy, as may vary depending upon the water source in need of treatment and the contaminants therein. Such biocides may be present in an amount of at least about 0.1 wt. % to about 20 wt. %, preferably at least about 0.1 wt. % to about 10 wt. %, more preferably from about 0.1 wt. % to about 5 wt. %, based on the total weight of the treatment fluid.

Examples of weighting agents include, but are not limited to, barite, hematite, calcium carbonate, siderite, and limonite. Exemplary examples of foaming agents include, without limitation, silicone foaming agents such as tetra(trimethylsiloxy)silane or polysiloxanes, fluorinated oligomeric or polymeric foaming agents such as fluorinated methacrylic copolymer or other fluorosurfactants.

Examples of surfactants that may be useful include anionic surfactants, cationic surfactants, nonionic surfactants, amphoteric surfactants (for example, zwitterionic surfactants), and combinations thereof. Many of each type of surfactant are widely available to one skilled in the art. These include fluorochemical, silicone and hydrocarbon-based surfactants.

Examples of anionic surfactants include, but are not limited to, alkali metal and (alkyl)ammonium salts of: alkyl sulfates and sulfonates such as sodium dodecyl sulfate and potassium dodecanesulfonate; sulfates of polyethoxylated derivatives of straight or branched chain aliphatic alcohols and carboxylic acids; alkylbenzenesulfonates, alkylnaphthalenesulfonates and sulfates (for example, sodium laurylbenzenesulfonate); ethoxylated and polyethoxylated alkyl and aralkyl alcohol carboxylates; glycinates (for example, alkyl sarcosinates and alkyl glycinates); sulfosuccinates including dialkyl sulfosuccinates; isethionate derivatives; N-acyltaurine derivatives (for example, sodium N-methyl-N-oleyl taurate); and alkyl phosphate mono- or di-esters (for example, ethoxylated dodecyl alcohol phosphate ester, sodium salt.

Examples of cationic surfactants include, but are not limited to, alkylammonium salts having the formula $C_rH_{2r+1}N(CH_3)_3X$, where X is OH, Cl, Br, $HSO_4$ or a combination of OH and Cl, and where r is an integer from 8 to 22, and the formula $C_aH_{a+1}N(C_2H_5)_3X$, where a is an integer from 12 to 18; gemini surfactants, for example, those having the formula: $[C_{16}H_{33}N(CH_3)_2C_tH_{2t+1}]X$, wherein t is an integer from 2 to 12 and X is OH, Cl, Br, $HSO_4$ or a combination of OH and Cl; aralkylammonium salts (for example, benzalkonium salts); and cetylethylpiperidinium salts, for example, $C_{16}H_{33}N(C_2H_5)(C_5H_{10})X$, wherein X is OH, Cl, Br, $HSO_4$ or a combination of OH and Cl.

Examples of amphoteric surfactants include, but are not limited to, alkyldimethyl amine oxides, alkylcarboxamidoalkylenedimethyl amine oxides, aminopropionates, sulfobetaines, alkyl betaines, alkylamidobetaines, dihydroxyethyl glycinates, imidazoline acetates, imidazoline propionates, ammonium carboxylate and ammonium sulfonate amphoterics and imidazoline sulfonates.

Examples of hydrocarbon nonionic surfactants include, but are not limited to, polyoxyethylene alkyl ethers, polyoxyethylene alkyl-phenyl ethers, polyoxyethylene acyl esters, sorbitan fatty acid esters, polyoxyethylene alkylamines, polyoxyethylene alkylamides, polyoxyethylene lauryl ethers, polyoxyethylene cetyl ethers, polyoxyethylene stearyl ethers, polyoxyethylene oleyl ether, polyoxyethylene octylphenyl ethers, polyoxyethylene nonylphenyl ethers, polyethylene glycol laurates, polyethylene glycol stearates, polyethylene glycol distearates, polyethylene glycol oleates, oxyethylene-oxypropylene block copolymer, sorbitan laurate, sorbitan stearate, sorbitan distearate, sorbitan oleate, sorbitan sesquioleate, sorbitan trioleate, polyoxyethylene sorbitan laurates, polyoxyethylene sorbitan stearates, polyoxyethylene sorbitan oleates, polyoxyethylene laurylamines, polyoxyethylene laurylamides, laurylamine acetate, ethoxylated tetramethyldecynediol, fluoroaliphatic polymeric ester, and polyether-polysiloxane copolymers.

In some embodiments, the surfactant may present in an amount of about 0.005 wt. % to about 15 wt. %, or about 0.01 wt. % to about 10 wt. % or about 0.01 wt. % to about 5 wt. %, or about 0.01 wt. % to about 2 wt. % or about 0.5 wt. % to about 1.0 wt. %, based on the total weight of the treatment fluid.

Examples of dispersants include, but are not limited to, sulfonated styrene maleic anhydride copolymer, sulfonated vinyl toluene maleic anhydride copolymer, sodium naphthalene sulfonate condensed with formaldehyde, sulfonated acetone condensed with formaldehyde, lignosulfonates (e.g., modified sodium lignosulfonate), allyloxybenzene sulfonate, allyl sulfonate and non-ionic monomers, and interpolymers of acrylic acid.

Examples of solvents include, but are not limited to, water, flowback fluids, ethylene glycol monobutyl ether, methanol, isopropanol or mixtures thereof. For example, in one embodiment methanol may be added to the treatment fluid to prevent its freezing in cold climates and in such embodiments may be added in amounts that can range from about 1 wt. % to about 15 w.t %, based on the total weight of the treatment fluid. In some embodiments, the amount of solvent can be about 1 wt. %, about 2 wt. %, about 3 wt. %, about 4 wt. %, about 5 wt. %, about 6 wt. %, about 7 wt. %, about 8 wt. %, about 9 wt. %, about 10 wt. %, about 12 wt. %, or about 15 wt. %, based on the total weight of the treatment fluid. In other embodiments, the solvent may present in an amount of between about 0.1 wt. % to about 50 wt. % or about 0.1 wt. % to about 40 wt. % or about 0.1 wt. % to about 30 wt. % or about 0.1 wt. % to about 20 wt. % or about 0.1 wt. % to about 10 wt. % or about 0.1 to about 5 wt. %, based on the total weight of the treatment fluid.

Non-limiting examples of thinning agents suitable for use in the present disclosure include, but are not limited to, alkoxylated fatty alcohol, and non-ionic surfactants which comprise reaction products of ethylene oxide, propylene oxide and/or butylene oxide with $C_{10}$-$C_{22}$ carboxylic acids or $C_{10}$-$C_{22}$ carboxylic acid derivatives. Thinning agents suitable for use with the present disclosure are described in more detail in U.S. Pat. Nos. 7,435,706 and 7,638,466, each of which is incorporated by reference herein in their entirety.

Stabilizing agents may be added to equilibrium percitric acid-containing compositions to stabilize the percitric acid and hydrogen peroxide and prevent the decomposition of these constituents within the compositions. Various embodiments of the present disclosure do not require the use of at least one or more of such stabilizing agents. Examples of stabilizing agents may include couplers, hydrotropes, acid catalysts and the like that are conventionally used in equilibrium percitric acid-containing compositions to stabilize and improve shelf life of the composition.

Further examples of stabilizing agents include chelating agents or sequestrants. Such sequestrants include, but are not limited to, organic chelating compounds that sequester metal ions in solution, particularly transition metal ions. Such sequestrants include organic amino- or hydroxy-polyphosphonic acid complexing agents (either in acid or soluble salt forms), carboxylic acids (e.g., polymeric poly carboxylate), hydroxy carboxylic acids, aminocarboxylic acids, or heterocyclic carboxylic acids, e.g., pyridine-2,6-dicarboxylic acid (dipicolinic acid). Dipicolinic acid, 1-hydroxy ethylidene1, 1-diphosphonic acid ($CH_3C(PO_3H_2)_2OH$) (HEDP) are further example of stabilizing agents.

Additional examples of stabilizing agents commonly used in equilibrium chemistry to stabilize the percitric acid and hydrogen peroxide and/or prevent the premature oxidation of the composition include phosphonic acid or phosphonate salt. Phosphonic acids and phosphonate salts include HEDP; ethylenediamine tetrakis methylenephosphonic acid (EDTMP); diethylenetriamine pentakis methylenephosphonic acid (DTPMP); cyclohexane-1,2-tetramethylene phosphonic acid; amino [tri (methylene phosphonic acid)]; (ethylene diamine[tetra methylene-phosphonic acid)]; 2-phosphene butane-1,2,4-tricarboxylic acid; or salts thereof, such as the alkali metal salts, ammonium salts, or alkyloyl amine salts, such as mono, di, or tetra-ethanolamine salts; picolinic, dipicolinic acid or mixtures thereof. In some embodiments, organic phosphonates, for example, HEDP are well known as used stabilizing agents.

Examples of pH buffers include, but are not limited to, potassium hydroxide, sodium hydroxide, phosphate buffer, bicarbonate buffer and Tris buffer. However, it is to be understood that the treatment fluid is effective even if its pH is raised and the conjugate bases of the peracids are formed.

In one embodiment, the stabilizing agent/pH buffer is present in amounts from about 0.001 wt. % to about 30 wt. %, or about 0.001 wt. % to about 20 wt. %, or about 0.001 wt. % to about 10 wt. %, or about 0.01 wt. % to about 1 wt. %, based on the total weight of the treatment fluid.

Examples of scale inhibitors include, but are not limited to, phosphates, phosphate esters and the like. The scale inhibitor may present in an amount ranging between about 0.0001 wt. % to about 10 wt. %, or at least about 0.0001 wt. % to about 1 wt. %, preferably at least about 0.0001 wt. % to about 0.1 wt. %, preferably at least about 0.0001 wt. % to about 0.05 wt. %, based on the total weight of the treatment fluid.

The above-described treatment fluids may be included in various methods performed during oil- and gas-field operations. The treatment fluids may be used at any temperatures, such as at a temperature of between about 35° F. and about 400° F. (about 2° C. and about 204° C.). Preferably, the treatment fluids are used at a temperature where they best achieve the desired effects, which may be a temperature of between 77° F. and about 300° F. (about 25° and about 149° C.). In some embodiments, the use of the treatment fluids may be at a pressure between atmospheric pressure and fracture pressure, where the fracture pressure is defined as the pressure above which injection of fluids will cause the formation to fracture hydraulically. In addition, the treatment fluids may be used in any subterranean formation. For example, the subterranean formation may be a sandstone or a carbonate formation. Sandstone formations contain siliceous materials, like quartz, as the major constituent and may contain various amounts of clays (aluminosilicates such as kaolinite or illite) or alkaline aluminosilicates such as feldspars, and zeolites, as well as carbonates (calcite, dolomite, ankerite) and iron based minerals (hematite and pyrite). Carbonate formations contain calcium carbonates (dolomite and calcite) as the major constituent.

As discussed above, residual polymers can present difficulties in a variety of fields, including in various oil- and gas-field operations. Some polymers, especially polymers with carbon-carbon backbones, are particularly recalcitrant to traditional remediation techniques.

Provided herein are improved methods for degrading polymer systems using the treatment fluids of the present disclosure. These treatment fluids and methods may be used to effectively degrade a range of polymers commonly used in oil- and gas-field operations, including polymers with carbon-carbon backbones such as polyacrylamides (and the polymers described above). Further, these treatment fluids and methods may simultaneously degrade other organic molecules and pollutants associated with oil- and gas-operations. Finally, these treatment fluids and methods employ components that are more environmentally-friendly than conventional methods and components used in polymer breaking processes.

In some embodiments, the methods described herein can employ a treatment fluid containing a percitric acid to degrade a polymer (for example, as part of a hydraulic fracturing operation and/or as part of a remediation operation). For example, provided herein are methods for degrading a polymer within a subterranean formation, the subterranean formation being in fluid communication with a wellbore. The methods can comprise (a) injecting a treatment fluid comprising percitric acid into the wellbore; and (b) contacting the subterranean formation with the treatment fluid for an effective amount time to degrade the polymer. The injecting can be performed in a single injecting event, multiple injecting events, or as a continuous injecting process. The term "injecting" as used herein, refers to any mechanical device like a centrifugal pump, a piston pump, gear pump or any other device, commonly known in the art, for pressurizing and transporting a fluid from a low pressure environment into a higher pressure environment. The term "contacting" means direct or indirect binding or interaction between two or more entities (e.g., between the subterranean formation and treatment fluid).

In some embodiments, the amount of percitric acid present in the treatment fluid may be from about 0.1 ppm to about 100,000 ppm, based on the total weight of the treatment fluid, or any range therein. For example, the amount of percitric acid may range between about 0.25 ppm to about 50,000 ppm, or about 0.5 ppm to about 25,000 ppm, or about 0.75 ppm to about 10,000 ppm or about 1 ppm to about 5000 ppm or about 10 ppm to about 2500 ppm or about 25 ppm to about 1000 ppm, based on the total weight of the treatment fluid. In another embodiment, the amount of percitric acid may range from about 1 ppm to 1000 ppm, or from about 5 ppm to about 80 ppm, or from about 10 ppm to about 70 ppm, or from about 30 ppm to about 60 ppm, or from about 40 ppm to about 55 ppm, based on the total weight of the treatment fluid.

In some embodiments, the contacting step in the present methods can last for any suitable amount of time. In some embodiments, the contacting step can last for at least about 10 seconds. For example, the contacting step can last for at least about 30 seconds, 40 seconds, 50 seconds, 1 minute, 2 minutes, 3 minutes, 4 minutes, 5 minutes, 10 minutes, 15 minutes, 20 minutes, 25 minutes, 30 minutes, 40 minutes, 50 minutes, 1 hour, 2 hours, 3 hours, 4 hours, 5 hours, 6 hours, 7 hours, 8 hours 9 hours, 10 hours, 16 hours, 1 day, 3 days, 1 week, or until degradation or exhaustion of the chemistry.

In some embodiments, the polymer can be deposited on a surface within the subterranean formation. For example, the polymer can comprise a filter cake formed on a surface within the subterranean formation from a fluid used for drilling or fracturing. In certain embodiments, the polymer can comprise a polyacrylamide-containing filter cake in a well formed during drilling or completion of the well.

Also provided are methods of treating a subterranean formation that comprise (a) injecting a first treatment fluid comprising a polymer into the subterranean formation; and (b) breaking the viscosity of the first treatment fluid by fragmenting the polymer, wherein the polymer is fragmented by injecting a second treatment fluid comprising percitric acid into the subterranean formation. By way of example, the second treatment fluid may interact with the polymer to reduce the viscosity of the first treatment fluid forming a reduced viscosity treatment fluid. The reduced viscosity treatment fluid may then be recovered from the subterranean formation.

Also provided are methods of slickwater fracturing a subterranean formation that comprise (a) injecting a first treatment fluid comprising a polymer, such as polyacrylamide, into the subterranean formation at a pressure sufficient to create or enlarge a fracture in the subterranean formation; and (b) breaking the viscosity of the first treatment fluid by fragmenting the polyacrylamide, wherein the polyacrylamide is fragmented by injecting a second treatment fluid comprising percitric into the subterranean formation.

For example, in some embodiments, the above methods of breaking may reduce the viscosity of the first treatment fluid to a viscosity that is less than the viscosity of the first treatment fluid prior to injecting the second treatment fluid. For example, the breaking may reduce the viscosity of the first treatment fluid to a viscosity less than about 100,000 cP, or less than about 50,000 cP, or less than about 10,000 cP, or less than about 1000 cP. In other embodiments the breaking may reduce the viscosity of the first treatment fluid to less than about 500 cP, less than about 100 cP, less than about 50 cP, less than about 40 cP, less than about 30 cP, less than about 20 cP, less than about 15 cP, less than about 10 cP, less than about 5 cP, less than about 1 cP.

The amount of percitric acid present in the second treatment fluid may be from about 0.1 ppm to about 100,000 ppm, based on the total weight of the treatment fluid, or any range therein. For example, the amount of percitric acid may range between about 0.25 ppm to about 50,000 ppm, or about 0.5 ppm to about 25,000 ppm, or about 0.75 ppm to about 10,000 ppm or about 1 ppm to about 5000 ppm or about 10 ppm to about 2500 ppm or about 25 ppm to about 1000 ppm, based on the total weight of the treatment fluid. In another embodiment, the amount of percitric acid may range from about 1 ppm to 1000 ppm, or from about 5 ppm to about 80 ppm, or from about 10 ppm to about 70 ppm, or from about 30 ppm to about 60 ppm, or from about 40 ppm to about 55 ppm, based on the total weight of the treatment fluid.

Also provided herein are methods for degrading polymers within fluid handling systems associated with oil- and gas-field operations. For example, the methods described herein can be used to degrade, disintegrate, decompose and/or remove accumulated polymer deposited within one or more components of an above-ground fluid handling systems associated with oil- and gas-field operations, including fluid lines, filters, separator tanks, settling tanks, and storage tanks. Methods for degrading, disintegrating or decomposing polymers within fluid handling systems can comprise contacting one or more of the components of the fluid handling system with a treatment fluid comprising percitric acid for an effective amount of time to fragment the polymer. In some embodiments, this can comprise flowing the treatment fluid through the components of the fluid handling system. In some embodiments, methods can further comprise washing or flushing the components of the fluid handling system with water or flowback fluid to remove the degraded polymer from at least the components and in some embodiments, from the fluid handling system.

The amount of percitric acid present in the treatment fluid may range from about 0.1 ppm to about 100,000 ppm, based on the total weight of the treatment fluid, or any range therein. For example, the amount of percitric acid may range between about 0.25 ppm to about 50,000 ppm, or about 0.5 ppm to about 25,000 ppm, or about 0.75 ppm to about 10,000 ppm or about 1 ppm to about 5000 ppm or about 10 ppm to about 2500 ppm or about 25 ppm to about 1000 ppm, based on the total weight of the treatment fluid. In another embodiment, the amount of percitric acid may range from about 1 ppm to 1000 ppm, or from about 5 ppm to about 80 ppm, or from about 10 ppm to about 70 ppm, or from about 30 ppm to about 60 ppm, or from about 40 ppm to about 55 ppm, based on the total weight of the treatment fluid The contacting step can last for any suitable amount of time. In some embodiments, the contacting step can last for at least about 10 seconds. For example, the contacting step can last for at least about 30 seconds, 40 seconds, 50 seconds, 1 minute, 2 minutes, 3 minutes, 4 minutes, 5 minutes, 10 minutes, 15 minutes, 20 minutes, 25 minutes, 30 minutes, 40 minutes, 50 minutes, 1 hour, 2 hours, 3 hours, 4 hours, 5 hours, 6 hours, 7 hours, 8 hours 9 hours, 10 hours, 16 hours, 1 day, 3 days, 1 week or longer.

According to another embodiment, the present disclosure relates to methods of preventing polymer deposition during oil- and gas-field operations. More specifically, embodiments disclosed herein relate to preventing the formation of such polymer deposits on oilfield equipment, in a wellbore, and on or within the subterranean formation during oil- and gas-field operations. The inventors have advantageously found that a treatment fluid containing percitric acid may prevent the buildup of polymer deposits in the wellbore, on or within the subterranean formation or on downhole equipment. The method generally includes introducing the treatment fluid containing percitric acid into a wellbore in fluid communication with the subterranean formation containing a polymer during an oil- and gas-field operation and contacting the polymer with the treatment fluid for an effective amount of time to prevent the polymer from depositing on or within the subterranean formation.

The amount of percitric acid present in the second treatment fluid may be from about 0.1 ppm to about 100,000 ppm, based on the total weight of the treatment fluid, or any range therein. For example, the amount of percitric acid may range between about 0.25 ppm to about 50,000 ppm, or about 0.5 ppm to about 25,000 ppm, or about 0.75 ppm to about 10,000 ppm or about 1 ppm to about 5000 ppm or about 10 ppm to about 2500 ppm or about 25 ppm to about 1000 ppm, based on the total weight of the treatment fluid. In another embodiment, the amount of percitric acid may range from about 1 ppm to 1000 ppm, or from about 5 ppm to about 80 ppm, or from about 10 ppm to about 70 ppm, or from about 30 ppm to about 60 ppm, or from about 40 ppm to about 55 ppm, based on the total weight of the treatment fluid.

The contacting step can last for any suitable amount of time. In some embodiments, the contacting step can last for at least about 10 seconds. For example, the contacting step can last for at least about 30 seconds, 40 seconds, 50 seconds, 1 minute, 2 minutes, 3 minutes, 4 minutes, 5 minutes, 10 minutes, 15 minutes, 20 minutes, 25 minutes, 30 minutes, 40 minutes, 50 minutes, 1 hour, 2 hours, 3 hours, 4 hours, 5 hours, 6 hours, 7 hours, 8 hours 9 hours, 10 hours, 16 hours, 1 day, 3 days, 1 week or longer.

It is known that polymers found in treatment fluids are also capable of complexing with polyvalent metal ions found in the wellbore and within the subterranean formation forming polymer scale when drilling through formations of that type and during completions. According to another embodiment, it has been found that when percitric acid is present in the treatment fluid, it may prevent the buildup of polymer scale in the wellbore, on downhole equipment, or on or within the subterranean formation itself. For example, percitric acid may be added to treatment fluids generally used in the normal course of drilling or oil recovery. This improved treatment fluid may then be used in drilling or in oil recovery operations to prevent the buildup of polymer scale in the wellbore, on the downhole equipment and on the earthen formation. The present disclosure addresses any polymer scale that is or may be induced by the interaction of polyvalent metal ions and polymer regardless of the source of the polyvalent metal ions.

In still other embodiments, it has been found that the presence of percitric acid in a treatment fluid used as a remediation fluid may remove polymer scale from the wellbore, on downhole equipment, or on or within the subterranean formation itself. For example, after polymer scale has been observed on the equipment, or thought to exist on the subterranean formation, the remediation fluid of the present disclosure may be introduced downhole. The remediation fluid may then remove the polyvalent ions from the crosslinked polymer, allowing the polymer to return to its fluid, un-crosslinked state. The polymer may then be recycled into a treatment fluid for circulation or other use in the wellbore. Alternatively, the remediation fluid may be used to remove polymer scale from equipment.

Polyvalent metal cations which may crosslink the polymer may stem from minerals naturally present in the subterranean formations, from metallic substances in oilfield equipment, or from base fluids used in formulating treatment fluids (for example, from brines). Nonlimiting examples of such metal cations include calcium, magnesium, strontium, boron, cobalt, copper, zirconium, titanium, aluminum, iron, chromium, hafnium, and the like. For instance, Fe(II)/Fe(III) cations are dissolved from iron-containing minerals and solids in the downhole environment, and they may crosslink with the polymer to form scale. As a result, the polymer crosslinked with Fe(II)/Fe(III) cations may form an insoluble solid deposition or scale on the formation and/or oilfield equipment.

The result of this crosslinking is polymer immobilization and formation plugging due to a gelation mechanism. Heavy metal ions such as $Cr^{3+}$, $Al^{3+}$, $Fe^{2+}$, $Ca^{2+}$ and $Fe^{3+}$ are well known to cause gelation of the polymer. There are also other ions which may complex with the polymer in certain pH intervals. Polymer gelation is thought to occur via the carboxylic groups, and the mechanism of gelation does not appear to selectively favor any polyvalent ion over others. The crosslinking reaction is thought to be a ligand exchange reaction where water molecules coordinated to the heavy metal ion are exchanged for the carboxylic groups of the polymer. The polyvalent heavy metal ion may complex to several carboxylic groups of the polymer backbone causing the polymer chain to crosslink with itself, or with other polymer chains forming an insoluble scale or gel.

When used in flooding, oil production is thus reduced because the polymer cannot readily migrate through the rock formation. Similarly, scale deposits can also result in plugging of wellbores, well casing perforations and tubing strings, as well as sticking of downhole safety valves, downhole pumps and other downhole and surface equipment and lines.

As mentioned above, the inventors have advantageously found that the presence of percitric acid in the treatment fluid may prevent the formation of such polymer scale or may remove such polymer scale in the downhole environment.

Accordingly, to address such polymer scale, the treatment fluids of embodiments of this disclosure containing percitric acid may be placed in the wellbore using conventional techniques known in the art. If used as a preventative additive, the percitric acid may be present in a treatment fluid used as a drilling, completion, or workover fluid. If, however, remediation of a particular interval of the wellbore is needed, percitric acid may be present in a treatment fluid used as a remediation fluid which may be injected into such interval, in addition to other intervals. The treatment fluids above may contain an amount of percitric acid sufficient to prevent polymer crosslinking, or alternatively to remediate polymer crosslinking. The treatment fluids may be used in conjunction with any drilling, completion, or production operation.

Thus, according to an embodiment, there is provided a method to prevent polymer scale (i.e. a polymer-polyvalent metal ion complex) from forming during an oil- and gas-field operation including placing the treatment fluid containing percitric acid into a wellbore in fluid communication with a subterranean formation where at least one of the wellbore or subterranean formation contains a polymer and a polyvalent metal ion and allowing the treatment fluid to interact with the polymer and polyvalent metal ion for an effective amount of time to prevent the polymer and polyvalent metal ion from complexing and forming polymer scale.

According to another embodiment, there is provided a method for removing polymer scale (i.e. a polymer-polyvalent metal ion complex) formed in a wellbore or subterranean formation during an oil- and gas-field operation including placing the treatment fluid containing percitric acid into a wellbore in fluid communication with a subterranean formation, where at least one of the wellbore or subterranean formation contains polymer scale, and allowing the treatment fluid to interact with or contact the polymer scale for an effective amount of time to remove the polymer scale from the wellbore or subterranean formation.

The amount of percitric acid present in the treatment fluid may be from about 0.1 ppm to about 100,000 ppm, based on the total weight of the treatment fluid, or any range therein. For example, the amount of percitric acid may range between about 0.25 ppm to about 50,000 ppm, or about 0.5 ppm to about 25,000 ppm, or about 0.75 ppm to about 10,000 ppm or about 1 ppm to about 5000 ppm or about 10 ppm to about 2500 ppm or about 25 ppm to about 1000 ppm, based on the total weight of the treatment fluid. In another embodiment, the amount of percitric acid may range from about 1 ppm to 1000 ppm, or from about 5 ppm to about 80 ppm, or from about 10 ppm to about 70 ppm, or from about 30 ppm to about 60 ppm, or from about 40 ppm to about 55 ppm, based on the total weight of the treatment fluid.

The treatment fluid may be allowed to interact with or contact the polymer and polyvalent metal ion or the polymer scale for any time effective to prevent polymer scale from forming or removing polymer scale. In some embodiments this may be for a time of at least about 10 seconds. For example, the interacting step can last for at least about 30 seconds, 40 seconds, 50 seconds, 1 minute, 2 minutes, 3 minutes, 4 minutes, 5 minutes, 10 minutes, 15 minutes, 20 minutes, 25 minutes, 30 minutes, 40 minutes, 50 minutes, 1 hour, 2 hours, 3 hours, 4 hours, 5 hours, 6 hours, 7 hours, 8 hours 9 hours, 10 hours, 16 hours, 1 day, 3 days, 1 week or longer.

According to another embodiment, the treatment fluid containing percitric acid may be used in methods to remove polyvalent metal ions from water or flowback fluid to make such water or flowback fluids suitable for subsequent use in oil- and gas-field operations. The method includes contacting the water or flowback fluid with the treatment fluid comprising percitric acid for an effective amount of time to remove the polyvalent metal ions from the water or flowback fluid and thereby form a treated fluid.

The amount of percitric acid present in the treatment fluid may be from about 0.1 ppm to about 100,000 ppm, based on the total weight of the treatment fluid, or any range therein. For example, the amount of percitric acid may range between about 0.25 ppm to about 50,000 ppm, or about 0.5 ppm to about 25,000 ppm, or about 0.75 ppm to about 10,000 ppm or about 1 ppm to about 5000 ppm or about 10 ppm to about 2500 ppm or about 25 ppm to about 1000 ppm, based on the total weight of the treatment fluid. In another embodiment, the amount of percitric acid may range from about 1 ppm to 1000 ppm, or from about 5 ppm to about 80 ppm, or from about 10 ppm to about 70 ppm, or from about 30 ppm to about 60 ppm, or from about 40 ppm to about 55 ppm, based on the total weight of the treatment fluid.

The contact time may last for at least about 10 seconds. For example, the contact time may last for at least about 30 seconds, 40 seconds, 50 seconds, 1 minute, 2 minutes, 3 minutes, 4 minutes, 5 minutes, 10 minutes, 15 minutes, 20 minutes, 25 minutes, 30 minutes, 40 minutes, 50 minutes, 1 hour, 2 hours, 3 hours, 4 hours, 5 hours, 6 hours, 7 hours, 8 hours 9 hours, 10 hours, 16 hours, 1 day, 3 days, 1 week or longer.

A key benefit of removing or suppressing polyvalent metal ions from water or flowback fluids is that the treated fluid can be reused, for example, as a base fluid of a subsequent treatment fluid. In some cases, removal of polyvalent metal ions makes the treated fluid more suitable for eventual disposal.

Thus, in one embodiment, the method may further comprise using the treated fluid to form a new treatment fluid or disposing of the treated fluid. Optionally, the method may further comprise introducing the new treatment fluid into a subterranean formation.

In one particular embodiment, there is provided a method to control iron in subterranean formations during oil- and gas-field operations using the treatment fluid containing percitric acid. The method generally includes injecting the treatment fluid into the subterranean formation containing iron and allowing the treatment fluid to interact with or contact the iron for an effective amount to time to control iron in the subterranean formation. In one embodiment, the treatment fluid is substantially free of a chelating agent. $Fe^{2+}$ is commonly forced into $Fe^{3+}$ by traditional breakers ($H_2O_2$, Persulfates, Perborates, $ClO_2$), this effect is extremely detrimental to polymers commonly used in subterranean formations during oil- and gas-operations as it only takes small amounts (up to about 25 ppm) of $Fe^{3+}$ to truly cause negative effects (such effects being within one-month of for example, flocculation or crosslinking of the polymer). The surprising effect of percitric acid according to the present disclosure is that it has the ability to absorb $Fe^{2+}$ but more importantly $Fe^{3+}$ in a rapid capacity, allowing its oxidizing capabilities to truly interact and successfully break polymers where traditional breakers will cause crosslinking and flocculation effects.

The term "iron control" for the purpose of this application refers to the prevention or at least reduction of iron oxide precipitates that form in a formation during the treatment thereof as a consequence of iron cations that are naturally present in the formation or iron cations that originate from the dissolution of iron from the equipment being used or production of the well. While the presence of iron cations may have other disadvantages when treating subterranean formations, the formation of ferric hydroxide solids is a substantial problem in formation treatments because in many cases it can lead to formation damage. In some embodiments iron control may also refer to the prevention of asphaltic sludge, by preventing the polar groups in asphaltenes from reacting with the ferric iron. Iron control in other embodiments may also refer to the prevention of or at least reduction of the precipitation of any other type of insoluble iron salt, especially iron sulfides which can form in the well and near-wellbore area especially in sour wells, i.e. wells containing $H_2S$.

The amount of percitric acid present in the treatment fluid may be from about 0.1 ppm to about 100,000 ppm, based on the total weight of the treatment fluid, or any range therein. For example, the amount of percitric acid may range between about 0.25 ppm to about 50,000 ppm, or about 0.5 ppm to about 25,000 ppm, or about 0.75 ppm to about 10,000 ppm or about 1 ppm to about 5000 ppm or about 10 ppm to about 2500 ppm or about 25 ppm to about 1000 ppm, based on the total weight of the treatment fluid. In another embodiment, the amount of percitric acid may range from about 1 ppm to 1000 ppm, or from about 5 ppm to about 80 ppm, or from about 10 ppm to about 70 ppm, or from about 30 ppm to about 60 ppm, or from about 40 ppm to about 55 ppm, based on the total weight of the treatment fluid.

Use of the above described treatment fluid containing percitric acid to control iron may ensure that some chemical additives, such as chelating agents, corrosion inhibitors, anti-sludge agents, iron control agents, scale inhibitors, are needed in much smaller amounts (or may not be needed at all) to achieve a similar effect to that of state of the art treatment fluids. Accordingly, the chemicals burden of the method may be reduced creating a more sustainable way to produce oil and/or gas. Under some conditions these additives are even completely redundant, and in one embodiment the treatment fluid used for iron control is substantially free of a chelating agent.

Furthermore, in some embodiments, percitric acid in combination with a biocide or bactericide in the treatment fluid may reduce the number of and sometimes even fully remove the bacteria responsible for the formation of sulfides from sulfate. As iron can form a precipitate with sulfide, in this way iron control also takes place. The combination of percitric acid with a biocide or bactericide may be synergistic, i.e. less biocide or bactericide is required to control the growth of microorganisms in the presence of percitric acid, reducing the negative environmental effect of using large quantities of biocides or bactericides with their inherent negative eco-tox profile.

Moreover, in another particular embodiment, there is provided a method for oxidizing a polymer while preventing a polymer-polyvalent metal ion complex deposit from forming during an oil- and gas-field operation by placing the treatment fluid of the present disclosure into a wellbore in fluid communication with a subterranean formation and allowing the treatment fluid to interact with the polymer for an effective period of time where at least one of the wellbore or the subterranean formation contains the polymer. As discussed above, the treatment fluid of the present disclosure has the ability to absorb $Fe^{2+}$ and more importantly $Fe^{3+}$ in a rapid capacity thus allowing the treatment fluid, and in particular, percitric acid, to oxidize the polymer more effectively than traditional oxidizing agents used in oil- and gas-field operations for oxidizing the polymers above.

In yet another embodiment, the treatment fluid containing percitric acid may be used in oil- and gas-field operations to at least: reduce microbial or viral populations on a surface or object or in liquid system containing a body or stream of water or flowback fluid, or prevent biological fouling, or to control microorganism growth, or eliminate microbial contamination, or limit or prevent biological fouling in liquid systems containing water or flowback fluids, or limit or prevent biological fouling on the surfaces of equipment that come in contact with such liquid systems. The method generally includes contacting the surface or object or liquid system with the treatment fluid containing percitric acid for an effective amount of time to achieve the above-described effects.

Methods by which the treatment fluid comprising percitric acid are contacted with the surface or object or introduced into the liquid system are not critical. Contacting with or introduction of the treatment fluid may be carried out in a continuous or intermittent manner and will depend on the type of surface or object or water or flowback fluid being treated. In one embodiment, the treatment fluid is added to water or flowback fluids to form a treated fluid in need of treatment prior to the drilling and fracking in order to restrict the introduction of microbes into the reservoir and to prevent the microbes from having a negative effect on the integrity of the fluids. The treated fluid may be used for both slick water fracturing and/or gel fracturing, depending on the type of formation being fractured and the type of hydrocarbon expected to be produced.

The amount of percitric acid present in the treatment fluid may be from about 0.1 ppm to about 100,000 ppm, based on the total weight of the treatment fluid, or any range therein. For example, the amount of percitric acid may range between about 0.25 ppm to about 50,000 ppm, or about 0.5 ppm to about 25,000 ppm, or about 0.75 ppm to about 10,000 ppm or about 1 ppm to about 5000 ppm or about 10 ppm to about 2500 ppm or about 25 ppm to about 1000 ppm, based on the total weight of the treatment fluid. In another embodiment, the amount of percitric acid may range from about 1 ppm to 1000 ppm, or from about 5 ppm to about 80 ppm, or from about 10 ppm to about 70 ppm, or from about 30 ppm to about 60 ppm, or from about 40 ppm to about 55 ppm, based on the total weight of the treatment fluid.

In a further embodiment, the treatment fluid comprising percitric acid is added to water or flowback fluids in need of treatment before disposal. In such an embodiment, flowback fluids (for example, post fracking) are treated to minimize microbial contaminations in the waters and to remove solids prior to disposal into a subterranean well, reuse in a subsequent fracturing application or return into local environmental water sources.

According to embodiments, a sufficient amount of the treatment fluid containing percitric acid is added to the water or flowback fluid in need of treatment to provide a desired percitric acid concentration for antimicrobial efficacy. For example, water or flowback fluid is dosed until a percitric acid concentration within the water of flowback fluid is detected within the preferred concentration range (for example, about 0.1 ppm to about 10,000 ppm or about 1 ppm to about 1000 ppm or about 1 ppm to about 100 ppm).

The above method requires a certain minimal contact time of the percitric acid with the water or flowback fluid in need of treatment for occurrence of sufficient antimicrobial effect. In some embodiments, the contact time may be at least about 10 seconds. In some embodiments, the contact time may be at least about 1 minute or at least about 5 minutes or at least about 10 minutes, or at least about 30 minutes, or at least about 60 minutes.

According to another embodiment, the percitric acid-containing compositions made by the methods of the present disclosure may be used to improve friction reducer hydration speeds in treatment fluids containing polymer friction reducers. In particular, contacting of these treatment fluids with the composition containing percitric acid may produce a treatment fluid that exhibits a viscosity that is higher than the viscosity of similar treatment fluids that have not been contacted by the composition containing percitric acid for a certain of period time, such as from about 1 second or about 5 seconds or about 10 seconds or about 20 seconds or about 30 seconds after the treatment fluid has been contacted with the composition containing percitric acid, to less than about 20 minutes, or less than about 15 minutes or less than about 10 minutes or less than about 5 minutes after the treatment fluid has been contacted with the composition containing percitric acid. This is particularly advantageous since a higher viscosity is generally needed during crucial horizontal portions of a well completion. The method generally includes contacting a treatment fluid comprising a polymer with the composition containing percitric acid to form a treated treatment fluid and transporting the treated treatment fluid into a wellbore in fluid communication with a subterranean formation wherein the treated treatment fluid exhibits a viscosity higher than the similar treatment fluid that has not been contacted by the composition container percitric acid for a period of time ranging from about 5 seconds after the treated treatment fluid has been formed to less than about 20 minutes, or less than about 15 minutes or less than about 10 minutes or 5 minutes after the treated treatment fluid has been formed.

The amount of percitric acid present in the treated treatment fluid may be from about 0.1 ppm to about 70 wt. %, based on the total weight of the treated treatment fluid, or any range therein. For example, the amount of percitric acid may range between about 0.25 ppm to about 50,000 ppm, or about 0.5 ppm to about 25,000 ppm, or about 0.75 ppm to about 10,000 ppm or about 1 ppm to about 5000 ppm or about 10 ppm to about 2500 ppm or about 25 ppm to about 1000 ppm, based on the total weight of the treatment fluid. In another embodiment, the amount of percitric acid may range from about 1 ppm to 1000 ppm, or from about 5 ppm to about 80 ppm, or from about 10 ppm to about 70 ppm, or from about 30 ppm to about 60 ppm, or from about 40 ppm to about 55 ppm, based on the total weight of the treated treatment fluid.

In still another embodiment, there is provided a method of enhancing productivity of hydrocarbons from a hydrocarbon bearing subterranean formation by contacting the formation with the treatment fluids of the present disclosure. The advantage of this method is especially achieved when such treatment fluid is contacted with the formation prior to hydraulic fracturing.

The method may generally include introducing a first treatment fluid comprising percitric acid into the formation at a location where stimulation is desired. The first treatment fluid is then allowed to contact the formation and a second treatment fluid is subsequently injected into the subterranean formation at the location at a pressure sufficient to create or enlarge a fracture in the subterranean formation.

The amount of percitric acid present in the first treatment fluid may be from about 0.01 wt. % to about 50 wt. %, based on the total weight of the treatment fluid, or any range therein. For example, the amount of percitric acid may range between about 2 wt. % to about 50 wt. % or from about 5 wt. % to about 35 wt. % or from about 7 wt. % to about 25 wt. % or from about 10 wt. % to about 20 wt. %, based on the total weight of the treatment fluid. In another embodiment, the amount of percitric acid present in the treatment fluid may be from about 0.01 wt. % to about 2 wt. % or from about 0.05 wt. % to about 1.75 wt. % or from about 0.1 wt. % to about 1.5 wt. % or from about 0.5 wt. % to about 1 wt. %, based on the total weight of the treatment fluid.

In yet another embodiment, there is provided a method of removing at least a portion of deposits from oilfield equipment by injecting a treatment fluid containing percitric acid into the oilfield equipment. The oilfield equipment may include all types and varieties of equipment associated with oil and gas recovery and processing such as, but not limited to, casing, pumps, separators, tanks, lines, pipes, and the like. The method may be used with all such above equipment whether the equipment is positioned above surface or downhole.

The injecting of the treatment fluid into the oilfield equipment can normally be effected using methods known in the art, for example, by the use of pumps. In accordance with an embodiment, the treatment fluid can be kept in contact with the oilfield equipment after injection for any period of time, such as a period of time ranging from about 1 second to about 24 hours. The injecting may be effected in a single step or in more than one step. In some embodiments, after an initial injection, the treatment fluid may be circulated inside the oilfield equipment by the use of pumps for any period of time, such as from about 1 minute to about 24 hours.

Deposits removed from the oilfield equipment by the present method may include deposits formed of hydrocarbons, scale or a mixture thereof. Hydrocarbons include, but are not limited to, crude oil, shale oil, tar, asphaltene, and paraffin. Scale includes, but is not limited to, any carbonate, sulfate, or metal salt that has precipitated out of the water phase, trace formation material such as silica and clays, and corrosion materials. In certain embodiments, after the treatment fluid has been injected into and contacted with the oilfield equipment, the oilfield equipment is substantially free of such deposits.

Although the above method was directed to the removal of deposits from oilfield equipment, the method may be used to remove any type of contaminant material (for e.g. organic material, inorganic material or mixtures thereof) from any type of surface, including both metallic and non-metallic surfaces, of one or more pieces of industrial equipment. The method includes contacting the surface having a contaminant thereon with a composition comprising percitric acid according to this disclosure for an effective period of time such that at least a portion of the contaminant is removed from the surface. The composition may optionally include one or more of a corrosion inhibitor and chemical additive described above.

Metallic surfaces may include ferrous and non-ferrous surfaces. Ferrous surfaces include, but are not limited to, steel, stainless steel, cold-rolled steel, cast iron, tin-plated steels, copper-plated steels, organic-coated steels, galvanized steels and zinc/aluminum galvanized steels. Non-ferrous surfaces include, but are not limited to, aluminum and aluminum alloys, zinc and zinc-based alloys, zinc-aluminum alloys, and copper and copper.

Non-metallic surfaces include plastics, including but not limited to, polycarbonates, polyvinyl chlorides, polyethylenes, polypropylenes, thermoplastic polyesters or polyamides, polyurethanes, epoxies or polyepoxies, polystyrene or its copolymers, nylons and modified polyamides, and modified celluloses.

Without limitation, the composition containing percitric acid may disaggregate and/or dissolve contaminant materials from surfaces of industrial equipment within industrial facilities (for e.g., oil refineries, natural gas processing plants, petrochemical facilities, port terminals, chemical plants, industrial and institutional (I & I) settings, such as with dairy and food processing plant, and the like). In embodiments, the composition containing percitric acid may be used to remove a contaminant the material from surface of any piece of industrial equipment used in industrial facilities including vessels, tanks, vacuum towers, heat exchangers, piping, distillation columns, and the like. In embodiments, contaminant materials to be removed may include any contaminant material produced, stored, transported, or the like during the process of crude oil refinement, natural gas processing, hydrocarbon transport, hydrocarbon processing, hydrocarbon cleanup, chemical processing, food and dairy processing and the like. In embodiments, examples of contaminant materials may include, but are not limited to, residual oil, hydrogen sulfide, combustible gas, iron sulfides, the like, or any combinations thereof. In embodiments, the contaminant materials are contacted with the composition containing percitric acid, such that the contaminant materials are disaggregated and/or dissolved and may then be subsequently removed from the surface of the industrial equipment. The contaminant materials may be oxidized in the method and reduced to a harmless form.

As discussed above, the contaminant material removal method may include contacting the contaminant materials and/or the surface of the industrial equipment with the composition containing percitric acid. For example, in embodiments comprising a vessel containing contaminant materials disposed within, the composition may be poured, pumped, injected, or using any other suitable means, into the vessel such that the composition contacts the contaminant materials disposed therein. As another example, in embodiments comprising industrial equipment having contaminant materials disposed thereon, the composition containing percitric acid may be poured onto the contaminated portion of the industrial equipment or the contaminated portion of the industrial equipment may be submerged in the composition containing percitric acid such that the composition contacts the contaminant materials. In another embodiment, the composition containing percitric acid may be circulated though the contaminated equipment.

Any suitable timeframe during which the composition containing percitric acid is in contact with the contaminant materials may be used as an effective period of time. In embodiments, the timeframe may extend for a sufficient period whereby at least a portion of the contaminant materials are removed (i.e., disaggregated, dissolved, emulsified, neutralized, and/or oxidized). In an embodiment, the timeframe may be from about 30 seconds to about one day, such as at least about 1 minute or at least about 5 minutes, or at least 15 about minutes, or at least about 30 minutes or at least about 1 hour, or at least 1.5 about hours or at least about 2 hours. In alternative embodiments, the time frame may be from about 1 minute to about twelve hours. In further alternative embodiments, the time frame may be from about one minute to about six hours.

In embodiments, once at least a portion of the contaminant materials have been removed, the contaminant materials may reside in the composition containing percitric acid and may therefore be fluid and/or flowable within the composition. The contaminant materials residing within the composition may then be pumped, poured, or otherwise removed from the industrial equipment along with the composition.

The present disclosure will now be further described with reference to the following non-limiting examples.

EXAMPLES

Example 1: Scale Solubility

Figure 1:
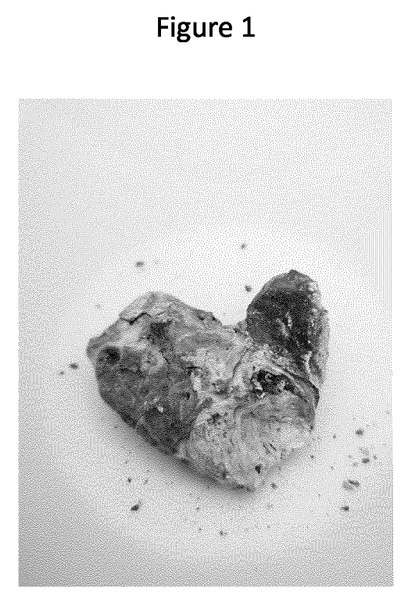
FIG. 1 depicts a piece of multi-layered scale recovered from a surface economizer.

A solid sample of scale was recovered from within an economizer on the external side of the stack tubes. The scale visually appeared to be layered and composed of multiple materials as shown in FIG. 1. Approximately 2 grams of the received scale was placed in 50 mL of a tested solvent at 20° C. and left to react to completion. The reaction between the solvent and scale was observed and the sample weight loss was recorded to determine the effectiveness of the solvent.

Acidic (20% HCl) and caustic solvents (20% KOH) were tested first to observe for reactions, neither of which produced a rapid reaction with the sample. A composition according to the present disclosure (10% Percitric Acid) was then tested and was observed to rapidly react and treat most of the compounds present within the scale sample, leaving only a minor amount of small residual solids. The solubility test results are shown in Table 1 below:

TABLE 1

| Percent of sample dissolved after 2 hours of exposure | |
|---|---|
| Solvent Tested | % Solubility |
| 20% HCl | 6% |
| 20% KOH | 0% |
| 10% Percitric Acid | 73% |

Example 2: Viscosity

Figure 2:
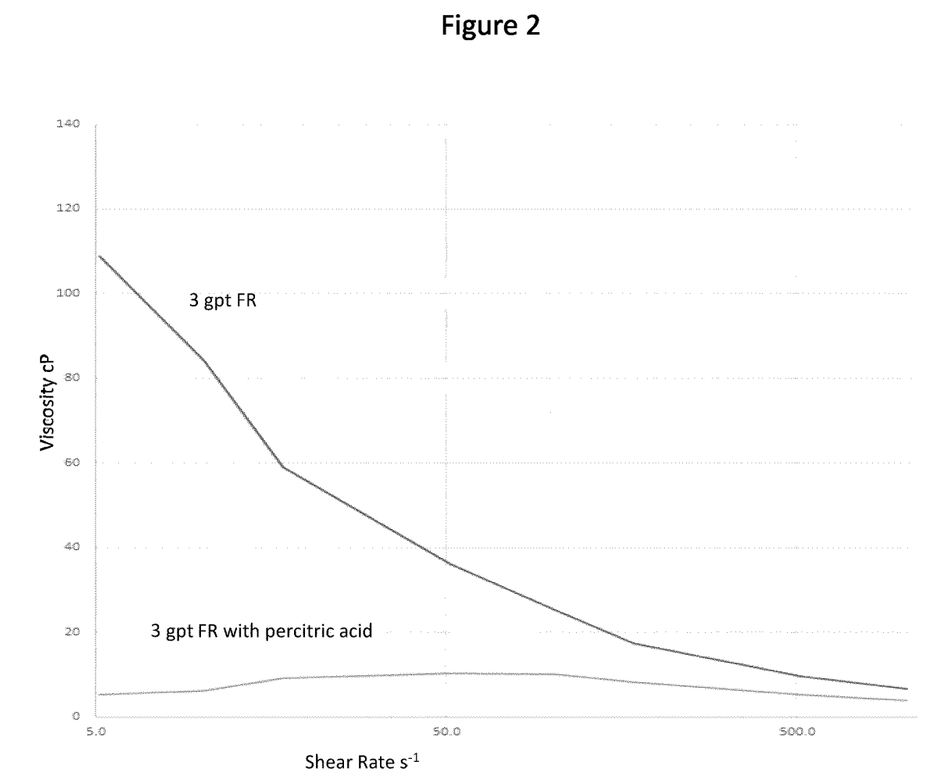
FIG. 2 depicts a shear sweep of samples containing a friction reducer alone and a friction reducer combined with percitric acid.

FIG. 2 depicts a shear sweep on samples containing: i) 3 gpt of a common polymeric friction reducer and ii) 3 gpt of the polymeric friction reducer+0.2 gpt (200 ppm) of 43 wt. % percitric acid in water after the samples were heated to 175° F. and then cooled. As shown in FIG. 2, sample ii) containing the polymeric friction reducer+percitric acid exhibited a significantly lower viscosity than sample i) containing the polymeric friction reducer alone indicating the ability of percitric acid to break the viscosity of a composition containing a polymeric friction reducer.

In addition, it was found that percitric acid can also increase friction reducer hydration speeds thereby generating more viscosity when it is needed, such as during crucial horizontal portions of a well completion. Because of this effect, less polymeric friction reducer may be needed during well completion providing both cost savings and potentially better production.

Figure 3:
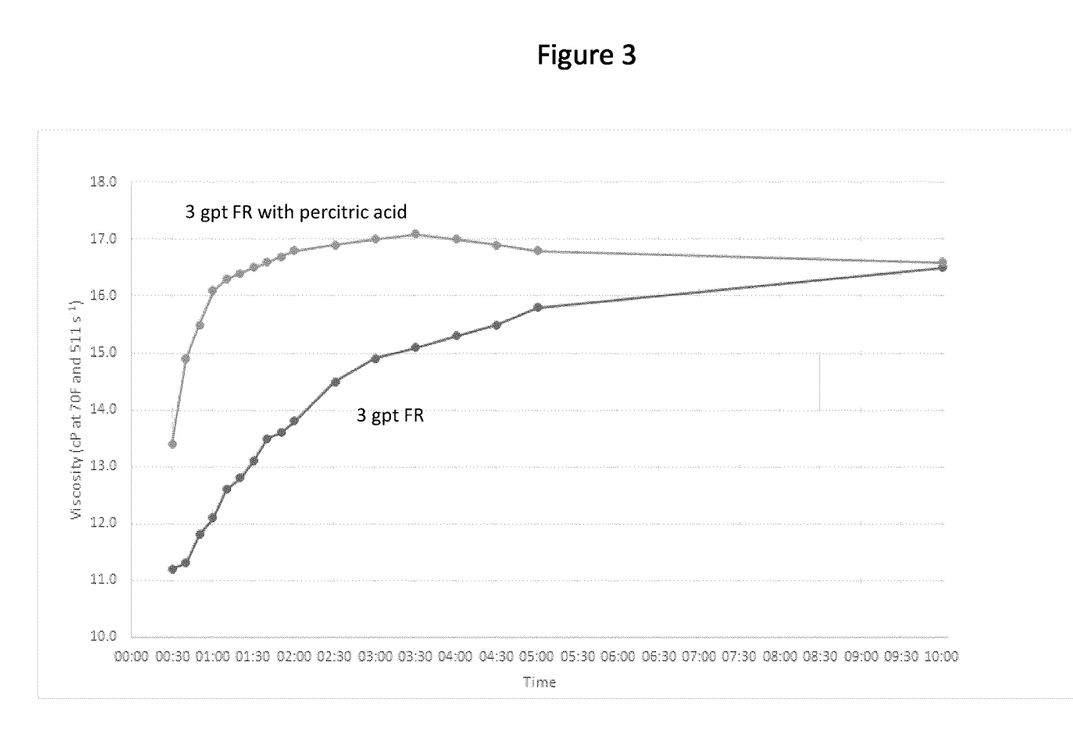
FIG. 3 depicts hydration curves of samples containing a friction reducer alone and a friction reducer combined with percitric acid.

FIG. 3 depicts hydration curves for: i) a first sample containing 3 gpt of a common polymeric friction reducer and ii) a second sample containing 3 gpt of the same polymeric friction reducer and 0.1 gpt (100 ppm) of 43 wt. % percitric acid in water. As shown in FIG. 3, sample ii) containing the polymeric friction reducer+percitric acid exhibited a higher viscosity during an initial period of time, for example, when a higher viscosity would be key or crucial for the transport of proppant to the wellbore and subterranean formation (i.e. from the first 1-5 min) than the viscosity for sample i).

Example 3: Iron Control

Figure 4:
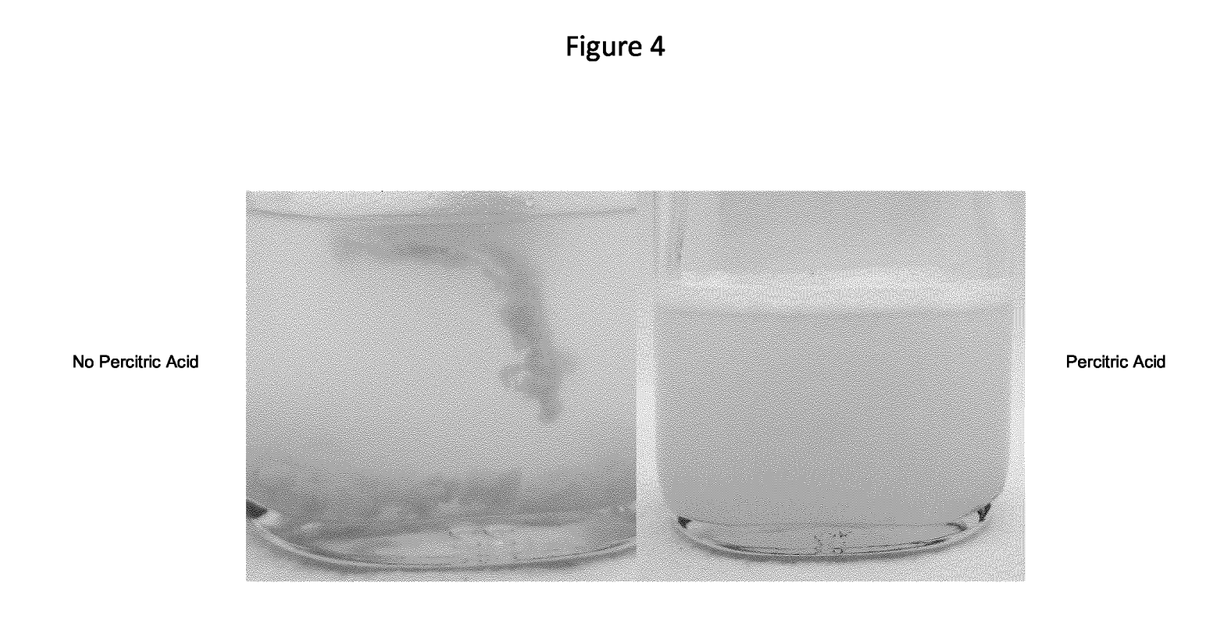
FIG. 4 depicts a slickwater fracturing fluid with 100 ppm iron induction and 100 ppm iron induction after the addition of 0.4 $L/m^3$ of 50 wt. % percitric acid solution.

By way of visual analysis, it was determined that a composition comprising percitric acid according to the present disclosure has the capability of preventing iron flocculation when utilized at low dose concentrations (below 0.4 $L/m^3$ of a 50% (w/w) percitric acid) within a slickwater fracturing fluid when the two are mixed and exposed to iron (in the form of $Fe^{2+}$, dosed at 100 ppm). As shown in FIG. 4, dosing the mixture without percitric acid with iron caused a rapid flocculation event in which an orangish, rubbery cloud like substance agglomerates together. In comparison, when percitric acid was present, no flocculation occurred, and the mixture remained homogenous.

Of course, the above-described embodiments are intended to be illustrative only and in no way limiting. The described embodiments of carrying out the invention are susceptible to many modifications of form, arrangement of parts, details, and order of operation. The invention, therefore, is intended to encompass all such modifications within its scope.

What is claimed is:

1. A method for degrading a polymer from a subterranean formation in fluid communication with a wellbore, wherein the method comprises:
    contacting citric acid and hydrogen peroxide to form a composition comprising percitric acid, wherein contacting citric acid and hydrogen peroxide to form a composition comprising percitric acid further comprises contacting citric acid and hydrogen peroxide and a base to form a composition comprising a conjugate base of percitric acid;
    adding one or more chemical additives to the composition to define a treatment fluid, wherein the percitric acid is present in an amount from about 0.001 wt. % to about 70 wt. %, based on the total weight of the treatment fluid, wherein the treatment fluid is substantially free of peracetic acid and performic acid;
    injecting the treatment fluid into the wellbore; and
    contacting the polymer with the treatment fluid for an effective amount time to degrade the polymer.

2. The method of claim 1, wherein at least one of the wellbore and the subterranean formation contains a polymer scale, wherein contacting the polymer comprises contacting the polymer scale with the treatment fluid for an effective amount of time to remove the polymer scale from the at least one of the wellbore and the subterranean formation.

3. The method of claim 1, wherein the treatment fluid comprises a first treatment fluid, wherein the method further comprises:
    injecting a second treatment fluid comprising a polymer into the subterranean formation; and
    breaking the viscosity of the second treatment fluid by fragmenting the polymer to form a reduced viscosity treated fluid, wherein the polymer is fragmented by injecting the first treatment fluid into the subterranean formation.

4. The method of claim 3, wherein the reduced viscosity treatment fluid is recovered from the subterranean formation.

5. The method of claim 3, wherein the first treatment fluid further comprises a friction reducer, wherein the method further comprises contacting the second treatment fluid with the first treatment fluid to form a mixture, wherein a viscosity of the mixture of the first treatment fluid and the second treated treatment fluid is greater than a viscosity of the second treatment fluid for a period of time ranging from about 1 second after contacting to less than about 20 minutes after contacting.

6. The method of claim 1, wherein the method further comprises:
injecting the treatment fluid into a component of a fluid handling system in fluid communication with the wellbore; and
contacting the component of the fluid handling system with the treatment fluid for an effective amount to time to at least one of fragment the polymer on or within the component and remove a contaminate from a surface of the component.

7. The method of claim 6, wherein the contacting of the component comprises flowing the treatment fluid through the component of the fluid handling system.

8. The method of claim 6, further comprising washing or flushing the component of the fluid handling system with water or a flowback fluid to remove the fragmented polymer from the component.

9. The method of claim 1, further comprising contacting at least one of the wellbore and the subterranean formation with the treatment fluid for an effective amount of time to reduce at least one of a microbial population and a viral population.

10. The method of claim 1, wherein the one or more chemical additives comprises a corrosion inhibitor, wherein the corrosion inhibitor comprises an alkali metal polyphosphate having a general formula $M_{n+2}P_nO_{3n+1}$ where M is sodium, potassium or ammonium and n is an integer of at least 2.

11. The method of claim 1, wherein the treatment fluid has a shelf-life stability configured to retain at least about 80% of the percitric acid activity after at least 1 month at a temperature ranging from about 20° C. to about 70° C.

12. The method of claim 1, wherein the one or more chemical additives comprises at least one of a corrosion inhibitor, a polymer, a wetting agent, an organophilic clay, an oxygen scavenger, a proppant, a biocide, a weighting agent, a foaming agent, a surfactant, a dispersant, an interfacial tension reducer, a solvent, a thinning agent, a stabilizing agent/pH buffer, and a scale inhibitor.

13. The method of claim 1, wherein the polymer comprises a polymer-polyvalent metal ion complex.

14. The method of claim 13, wherein the polyvalent metal comprises $Fe^{2+}$, $Fe^{3+}$ or a mixture thereof.

15. A method for degrading a polymer from a subterranean formation in fluid communication with a wellbore, wherein the method comprises:
contacting citric acid and hydrogen peroxide to form a composition comprising percitric acid;
adding one or more chemical additives to the composition to define a treatment fluid, wherein the percitric acid is present in an amount from about 0.001 wt. % to about 70 wt. %, based on the total weight of the treatment fluid;
injecting the treatment fluid into the wellbore; and
contacting the polymer with the treatment fluid for an effective amount time to degrade the polymer,
wherein contacting citric acid and hydrogen peroxide to form a composition comprising percitric acid comprises contacting citric acid and hydrogen peroxide and a base to form a composition comprising a conjugate base of percitric acid.

16. A method for preventing a polymer-polyvalent metal ion complex deposit from forming during an oil- and gasfield operation, wherein the method comprises:
injecting a treatment fluid into a wellbore in fluid communication with a subterranean formation, wherein the treatment fluid comprises citric acid, hydrogen peroxide, and a base forming a composition comprising percitric acid and a conjugate base of percitric acid present in an amount from about 0.001 wt. % to about 70 wt. %, based on the total weight of the treatment fluid and one more chemical additives, and wherein at least one of the wellbore or the subterranean formation contains a polymer and the polyvalent metal ion; and
allowing the treatment fluid to interact with the polymer and the polyvalent metal ion for an effective amount of time to prevent the polymer and polyvalent metal ion from complexing and depositing within at least one of the wellbore and the subterranean formation.

17. The method of claim 16, wherein the polyvalent metal comprises $Fe^{2+}$, $Fe^{3+}$ or a mixture thereof.

18. The method of claim 16, wherein the method further comprises contacting water or flowback fluid with the treatment fluid for an effective amount of time to remove or suppress the polyvalent metal ions from the water or flowback fluid and thereby form a treated fluid.

19. The method of claim 16, wherein the treatment fluid is substantially free of a chelating agent.

* * * * *